United States Patent
Hung et al.

(10) Patent No.: US 7,527,414 B2
(45) Date of Patent: May 5, 2009

(54) DIRECT-TYPE BACKLIGHT MODULE

(75) Inventors: Chen-Pin Hung, Tainan (TW); Stanley Huang, Tainan (TW); Tzu-Chang Wang, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 0 days.

(21) Appl. No.: 11/636,855

(22) Filed: Dec. 11, 2006

(65) Prior Publication Data

US 2007/0147035 A1   Jun. 28, 2007

(30) Foreign Application Priority Data

Dec. 12, 2005   (TW) .............................. 94143776 A

(51) Int. Cl.
*G01D 11/28* (2006.01)
(52) U.S. Cl. .................. 362/624; 362/30; 362/615
(58) Field of Classification Search .............. 362/23, 362/29, 30, 223, 224, 225, 237, 240, 242, 362/246, 247, 327, 328, 330, 613, 614, 619, 362/623, 624, 615, 625, 627
See application file for complete search history.

(56) References Cited

U.S. PATENT DOCUMENTS

| 3,241,256 | A | * | 3/1966 | Viret et al. | 362/30 |
| 6,065,846 | A | * | 5/2000 | Kato et al. | 362/30 |
| 6,193,383 | B1 | * | 2/2001 | Onikiri et al. | 362/615 |
| 7,204,632 | B2 | * | 4/2007 | Chen | 362/613 |
| 2004/0042194 | A1 | * | 3/2004 | Hsieh | 362/29 |
| 2004/0130911 | A1 | | 7/2004 | Chen | |

FOREIGN PATENT DOCUMENTS

TW   575722   2/2004

* cited by examiner

*Primary Examiner*—Y My Quach Lee
(74) *Attorney, Agent, or Firm*—Trop, Pruner & Hu, P.C.

(57) ABSTRACT

A direct-type backlight module includes a light-guide plate. The light-guide plate has a first surface and a second surface opposite the first surface. The first surface has at least one first groove. The backlight module may also include at least one light source. The light source corresponds to the first groove so that light emitted from the light source is reflected by the first groove. One or more optical films may be disposed on the first surface of the light-guide plate and a reflector may be disposed below the second surface of the light-guide plate. With the light-guide plate in place, the overall thickness of the backlight module is reduced, and the lamp mura is avoided.

24 Claims, 10 Drawing Sheets

DIRECT-TYPE BACKLIGHT MODULE

CROSS-REFERENCE TO RELATED APPLICATION

This claims priority under 35 U.S.C. § 119 of Taiwan Application No. 094143776, filed Dec. 12, 2005.

TECHNICAL FIELD

The present invention relates generally to a direct-type backlight module such as those in liquid crystal display devices.

BACKGROUND

Liquid crystal display (LCD) devices generally include an LCD panel and a backlight module under the LCD panel. The backlight module provides a light source to illuminate the LCD panel for displaying images. A cross-sectional view of a conventional direct-type backlight module is shown in FIG. 1. This backlight module 1 includes a plurality of lamps 11, a diffusion plate 12, a reflector 13, a housing 14, and a plurality of optical films 15. The lamps 11 may be cold cathode fluorescent lamps (CCFL) or LED light bars, both of which provide light. The diffusion plate 12 is disposed over the lamps 11 and diffuses the light produced by the lamps 11 onto a liquid crystal panel in a homogeneous manner. The reflector 13 is disposed within the housing 14 and reflects light diffused from the lamps 11 to the inner side of the housing 14 and to the diffusion plate 12. As depicted, the housing 14 is basically a rectangular frame that accommodates the lamps 11, the diffusion plate 12, and the reflector 13. The optical films 15 (such as a brightness-enhancing film and a diffusing film) are disposed on the upper surface of the diffusion plate 12 for adjusting the light emitted from the diffusion plate 12.

A space is maintained between the upper surface of the reflector 13 and the lower surface of the optical films 15 to allow light emitted by the lamps 11 to sufficiently mix. Adequate mixing of light helps to avoid the lamp mura caused by the lamp sources. The height of the light-mixing area is associated with the number of lamps 11 in the module 1. After the number of lamps is determined, the thickness of the light-mixing area, hence the thickness of the conventional backlight module 1, cannot be reduced and still meet the requirement of brightness without producing lamp mura. Thus, the overall thickness of the conventional backlight module 1 is associated with the height of the light-mixing area. Usually, the height of the light-mixing area is more than 20 mm.

Because the required distance between the reflector and optical films prevents reduction of the thickness of conventional direct-type backlight modules, the ability to achieve very slim LCD devices may be limited. Thus, there is a need for thinner and lighter-weight direct-type backlight modules that do not result in appreciable lamp mura and for a liquid crystal display device containing the thinner, lighter-weight direct-type backlight module.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In accordance with some embodiments, a direct-type backlight module having a reduced (as compared to conventional light-source devices) thickness is provided. The reduced-thickness backlight module may be used as a light source to illuminate liquid crystal display (LCD) devices, although embodiments are not so limited.

Liquid crystal display devices (not shown) generally include, but are not limited to, liquid crystal monitors, notebook computer screens, liquid crystal televisions, and the like. An LCD incorporating an embodiment of the invention may include a first substrate, a second substrate, and a liquid crystal layer. The first substrate of the LCD may be, for example, a color filter (CF) substrate and the second substrate may be, for example, a thin film transistor (TFT) substrate. A liquid crystal layer may be disposed between the first substrate and the second substrate. An embodiment of a direct-type backlight module, according to the present invention, may be disposed under the second substrate. The direct-type backlight module includes a plurality of light sources, a light-guide plate, a reflector, and one or more optical films. The light-guide plate has a grooved first surface and a second surface opposing the first surface. In other words, the grooved first surface and second surface are on opposite sides of the light-guide plate. The light sources and reflector are disposed below the first surface of the light-guide plate, whereas the optical film or films are disposed on the grooved first surface.

Figure 1:
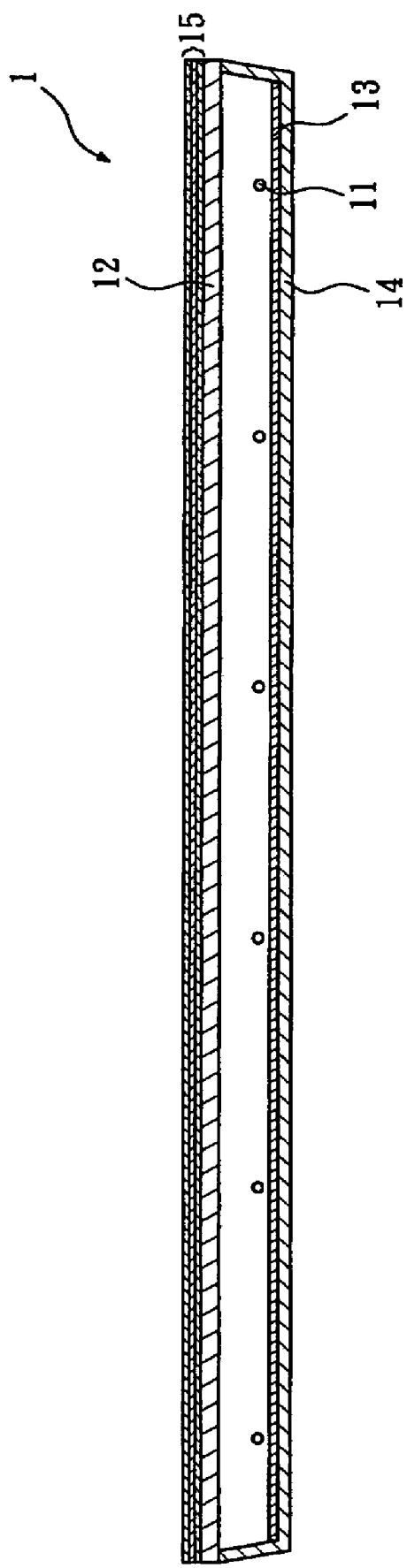
FIG. 1 is a cross-sectional view of a conventional direct-type backlight module.
Figure 2:
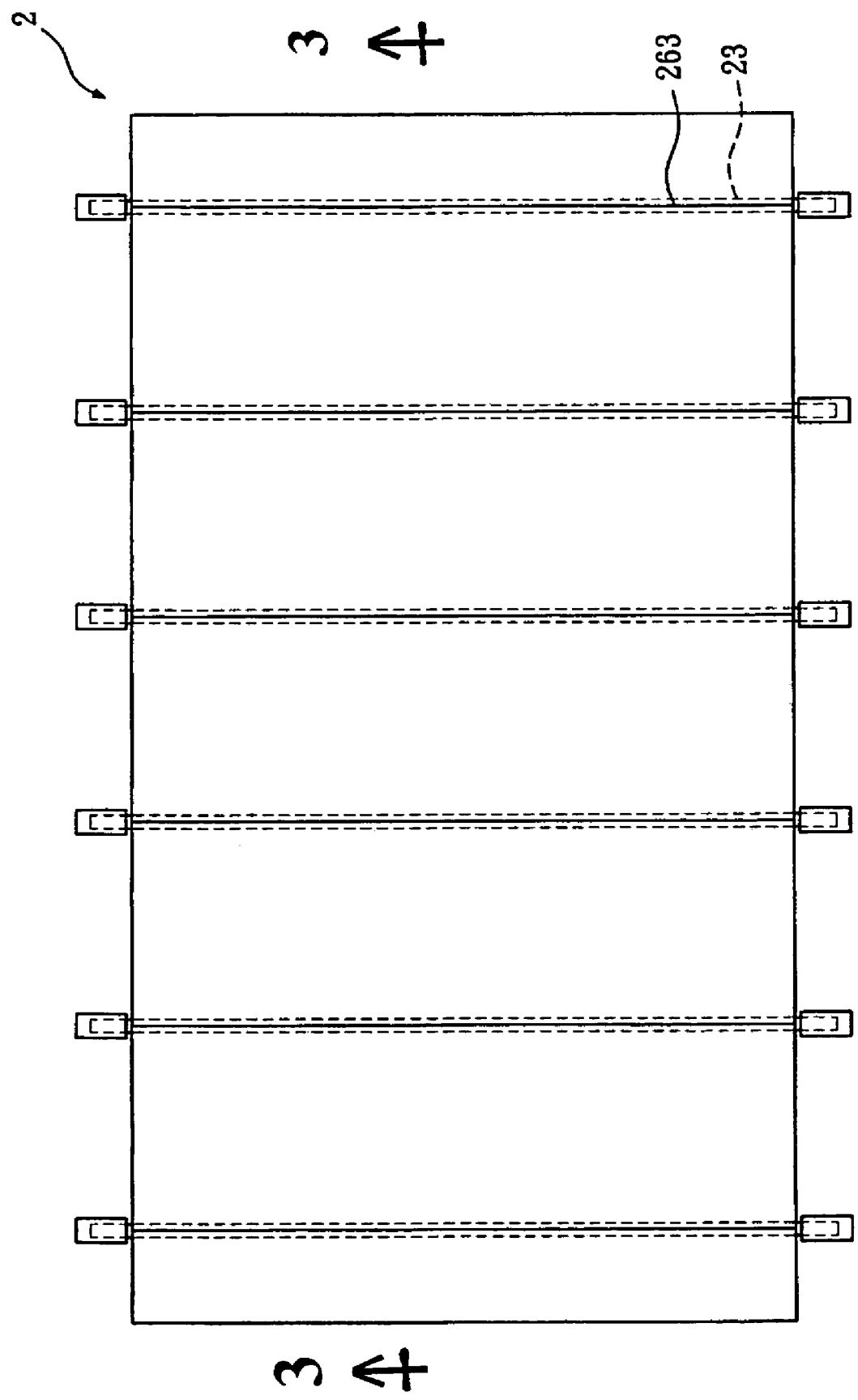
FIG. 2 is a top view of an exemplary direct-type backlight module according to an embodiment of the invention.

FIG. 2 illustrates a top view of an exemplary direct-type backlight module according to some embodiments of the present invention. Referring to FIG. 2, a backlight module 2 includes a plurality of light sources 23, which emit light for illuminating an LCD panel according to some embodiments. It should be noted that embodiments of the backlight module (according to the present invention) are not limited to use with LCD devices, they may be used with any application needing a uniform planar light source. Furthermore, it should also be noted that embodiments of the present invention are not limited to the six light sources 23 shown in FIG. 2; the number of light sources may be more or less than six. The design of a particular embodiment of a direct-type backlight module may depend, at least in part, on the number of light sources 23 used and the distance between those light sources. The light sources 23 may be cold cathode fluorescent lamps (CCFL) in some embodiments, whereas in other embodiments the light sources 23 may be LED light bars, although embodiments are not so limited.

Figure 3:
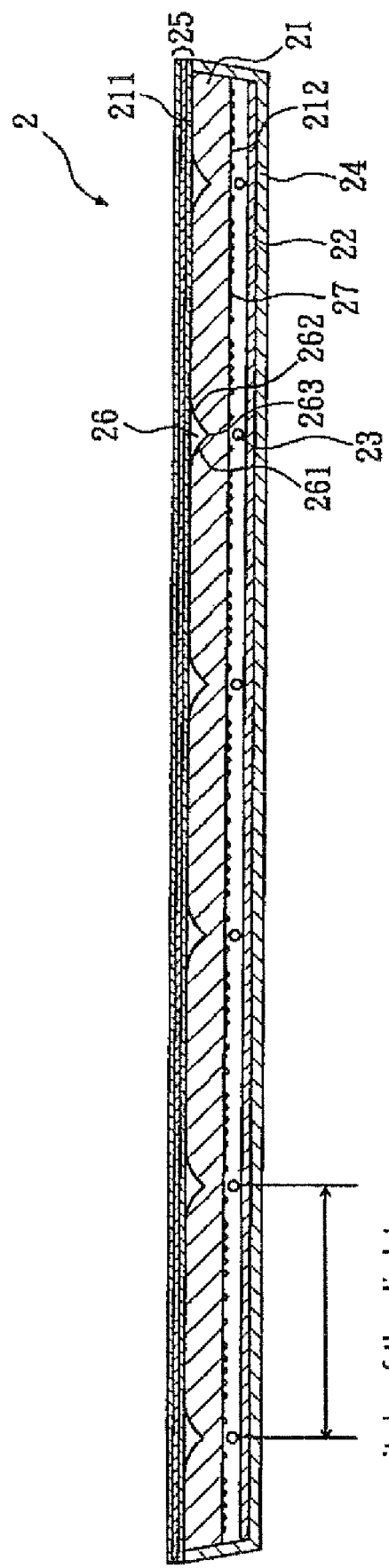
FIG. 3 is a cross-sectional view of the direct-type backlight module of FIG. 2 taken generally through line 3-3 in accordance with an embodiment.

A cross-section of the backlight module 2 taken generally through line 3-3 is shown in FIG. 3. As depicted, the backlight module 2 also includes a light-guide plate 21, a reflector 22, a housing 24, and a plurality of optical films 25. The light-guide plate 21 (and light sources 23) is disposed within the housing 24. The light-guide plate 21 has a first surface 211 (e.g., an upper surface) and a second surface 212 (e.g., a lower surface) opposite the first surface 211. As used herein, terms such as "upper" and "lower" and the like are used merely as labels to indicate a direction or relative position in some orientations. For example, in some orientations the surface 211 faces an "upper" direction and the surface 212 faces a "lower" direction. In other orientations, however, the feature can face another direction or have a different relative position. For example, in another orientation, the upper 211 and lower 212 surfaces can face another direction. Thus, features, such as the upper 211 and lower 212 surfaces, can be referred to more generally as "first" and "second" surfaces respectively.

Figure 6:
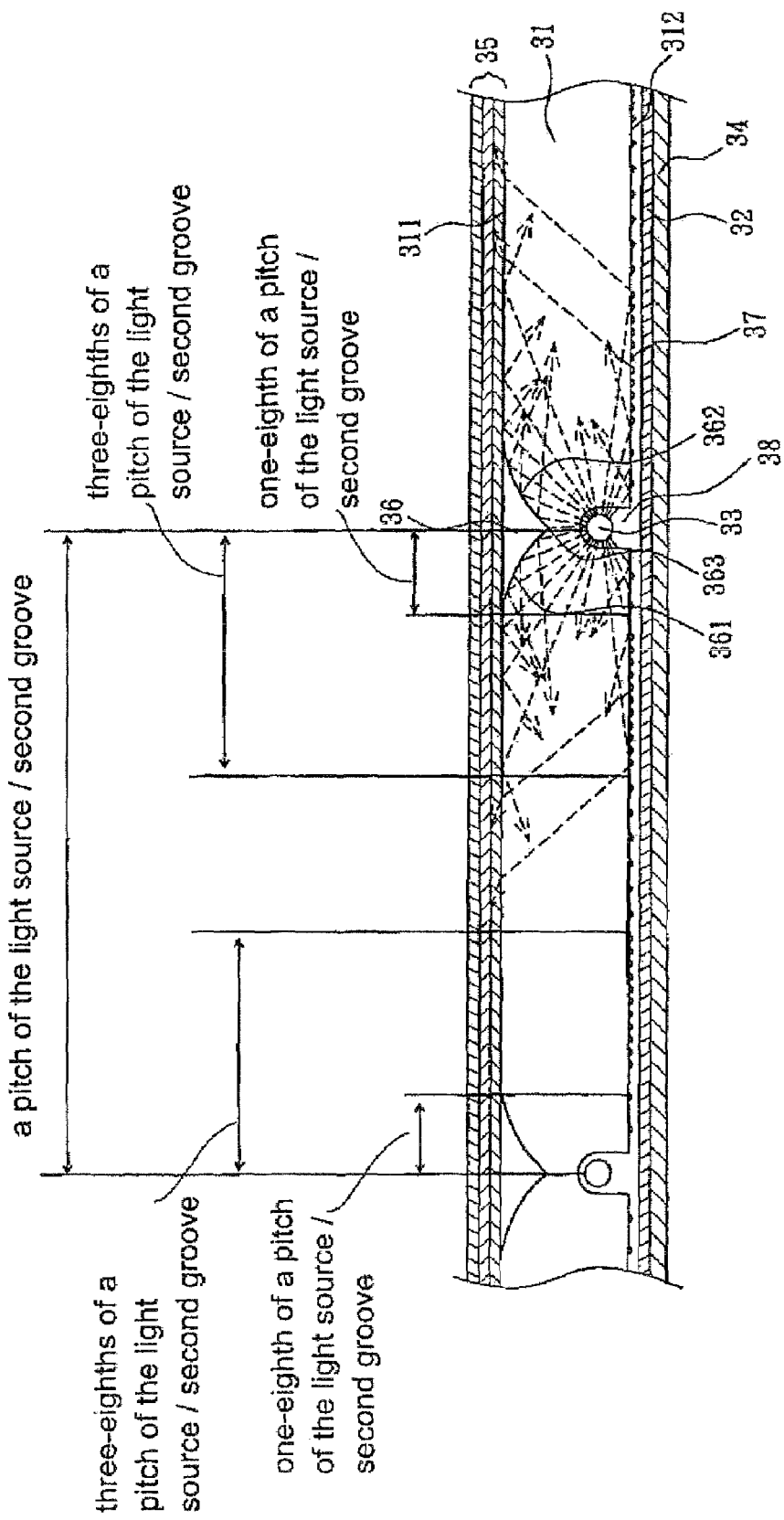
FIG. 6 is a partial close-up view of the direct-type backlight module of FIG. 5 showing a schematic drawing of the light path according to an embodiment.

According to an embodiment, the first surface 211 of the light-guide plate has a first groove 26 to reflect much of the light emitted by a particular light source 23 (see e.g., FIG. 6). As is shown in FIG. 3, there are a plurality of first grooves 26 in the light-guide plate 21. Each first groove 26 can have a light source 23 disposed under it. In other words, each light source 23 can be disposed under a first groove 26. In this way, a large part of the light emitted by the light sources 23 can be reflected by the first grooves 26. Furthermore, light can be diffused in the light-guide plate 21 by diffuser elements 27. Namely, the second surface 212 of the light-guide plate 21 has a plurality of diffuser elements 27 disposed thereon to diffuse light in the light-guide plate 21. The light-guide plate 21 may be formed from a material such as polycarbonate (PC), polymethyl methacrylate (PMMA), or another suitable material.

The housing 24 can also house the reflector 22. As is depicted in FIG. 3, the reflector 22 is disposed under the second surface 212 of the light-guide plate 21. In this example, the light sources 23 are also disposed under the second surface 212 of the light-guide plate, but above the reflector 22. In other words, the light sources 23 are disposed between the second surface 212 of the light-guide plate 21 and the reflector 22. The light sources 23, however, may also be disposed between the first surface 211 of the light-guide plate 21 and the reflector 22 in other embodiments. In the figure, the optical films 25 are shown as being disposed on the first surface 211 of the light-guide plate 21. Preferably, the optical films 25 include at least one diffusing film and one brightness-enhancing film, although embodiments are not so limited—other films may be added to or substituted for these films.

As noted above, the optical films 25 are "disposed on" the first surface 211 of the light-guide plate 21, and the reflector 22 is "disposed under" the second surface 212 of the light-guide plate 21. As used herein, these terms and terms similar thereto can refer to a direct or an indirect relationship. For instance, the optical film (or films 25) may be directly on the first surface 211, or the film may be on another structure (or structures) that are on the upper surface 211.

Figure 4:
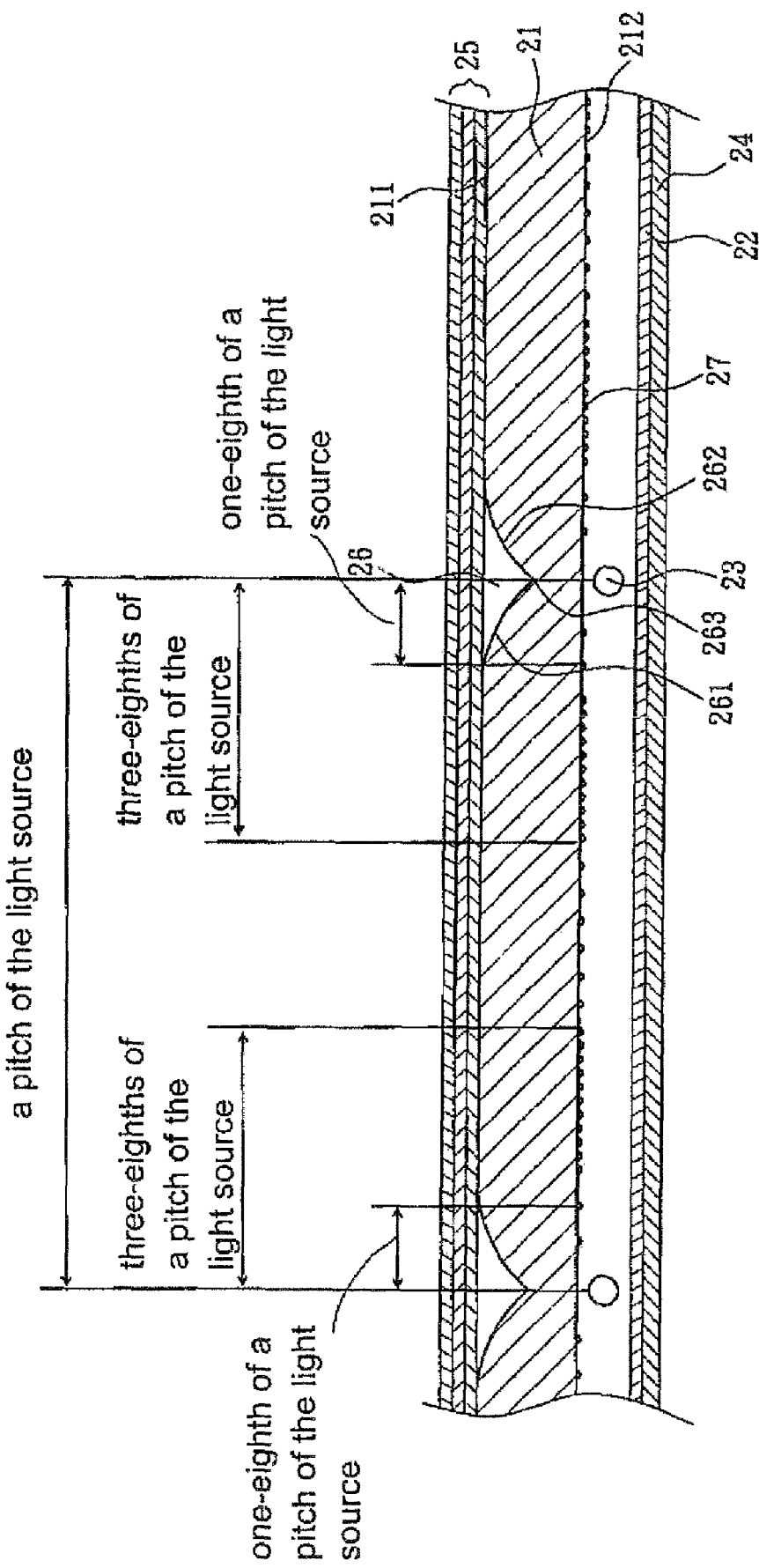
FIG. 4 is a partial close-up view of the direct-type backlight module of FIG. 2 and FIG. 3 in accordance with an embodiment.

Referring to FIGS. 3 and 4, each first groove 26 of the light-guide plate 21 is formed by two sides, side 261 and side 262. In some embodiments, the profile of the sides 261, 262 is cambered, and is preferably quadric, although in other embodiments the sides may have a different profile such as a profile shown in FIG. 9 or 10. The sides 261 and 262 meet at a converging line 263, which is situated above a light source 23. Thus, each light source 23 is situated below a corresponding converging line 263 in some implementations. Namely, each light source can be disposed substantially directly under a converging line 263. As can be seen in FIG. 2, the converging lines 263, hence the grooves 26, extend across one dimension of the light-guide plate and are parallel to each other.

Referring back to FIG. 4, a plurality of diffuser elements 27 can be disposed on the second surface 212 of the light-guide plate 21. Generally, the diffuser elements 27 are for diffusing the light emitted by the light sources 23 in the light-guide plate 21. The diffuser elements 27 can be formed by injection molding, printing dots, stamping, fly cut, V-cut, laser processing, or other known processing methods. The diffuser elements 27 shown in FIG. 4 are a plurality of matrix dots formed by printing.

A light-mixing area between the upper surface of the reflector 22 and the lower surface of the optical film 25 provides for the mixing of light. Generally, the height of the light-mixing area depends on the size of the backlight module, the number of light sources to be used in the backlight module, and the distance between the light sources. For example, in a conventional backlight module of a given size, the light-mixing area is increased or decreased if the number of light sources is decreased or increased respectively, which avoids lamp mura. Typically, in the conventional backlight module, the light-mixing area is more than 20 mm. In contrast, the height of the light-mixing area according to an embodiment of the backlight module can be reduced to less than 20 mm without observing appreciable lamp mura. In other words, the lamp mura caused by the light sources 23 can be avoided in an embodiment of the direct-type backlight module even when the height of the light-mixing area is reduced to less than 20 mm.

FIGS. 5, 6, 9, and 10 illustrate cross-sectional views or partial cross-sectional views of several embodiments of the direct-type backlight module. The differences between the several embodiments are due to the shapes of the first grooves and/or the topography of the second (lower) surface of the light-guide plate.

Figure 5:
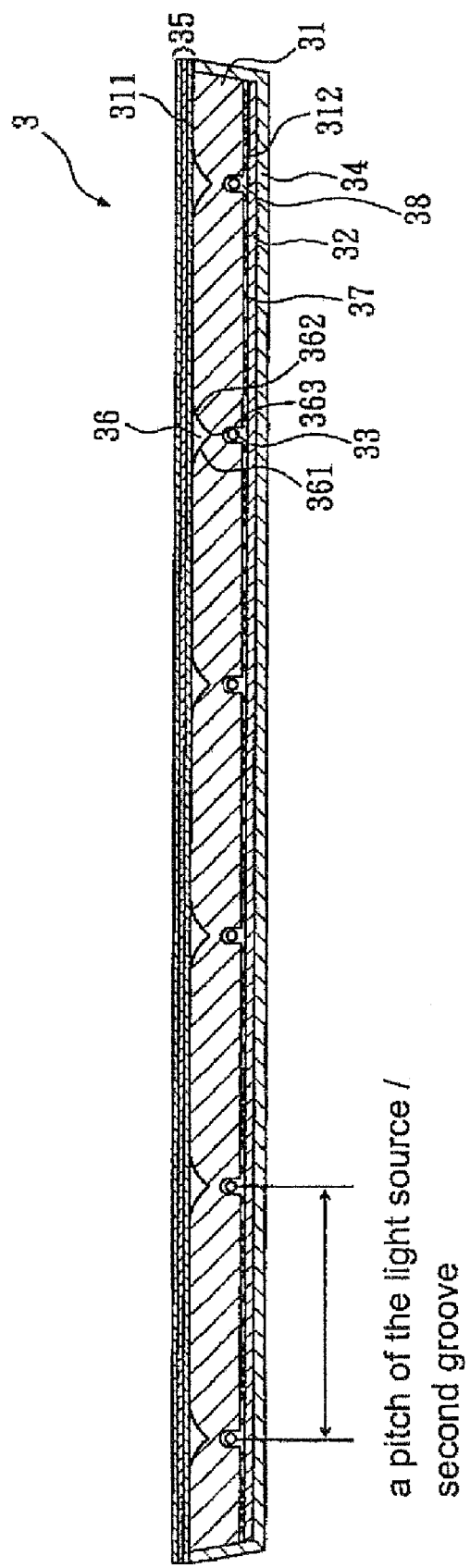
FIG. 5 is a cross-sectional view of a direct-type backlight module according to another embodiment of the invention.

Referring to FIG. 5, a direct-type backlight module 3 is shown that is similar to the module 2 except for the configuration of the second surface of the light-guide plate. For instance, the backlight module 3 includes a light-guide plate 31, a reflector 32, a plurality of light sources 33, a housing 34, and one or more optical films 35. The light-guide plate 31 has a first surface 311 (an upper surface) and a second surface 312 (a lower surface) opposite the first surface 311. The first surface 311 of the light-guide plate 31 has a plurality of first grooves 36. But the second surface 312 of the plate 31 also has a plurality of grooves—second grooves 38. As is shown in FIGS. 5 and 6, the second grooves 38 oppose the first grooves 36, and each second groove 38 accommodates a light source 33 that is disposed under the corresponding first groove 36. Thus, in this embodiment of the light-guide plate, the light sources 33 are disposed under the first surface 311 and above the second surface 312, within the light-guide plate 31. The light sources 33 may be cold cathode fluorescent lamps (CCFL) in some embodiments or LED light bars in other embodiments without embodiments of the direct-type backlight module being limited thereto. As with the direct-type backlight module 2, the reflector 32 is disposed under the second surface 312 of the light-guide plate 31 and the optical films 35 are disposed on the first surface 311 of the light-guide plate 31. Preferably, the optical films 35 include at least one diffusing film and one brightness-enhancing film, although embodiments of the backlight module 3 are not so limited.

Still referring to FIGS. 5 and 6, each first groove 36 is depicted as being formed by two sides, side 361 and side 362. In some embodiments, the profile of the sides 361, 362 is cambered, and preferably quadric, although embodiments are not limited thereto. The sides 361 and 362 meet at a converging line 363. Each converging line 363 is situated above and corresponds to a second groove 38. Like converging lines 263, converging lines 363 may be parallel, hence, the grooves 36 are also parallel.

The second surface 312 of the light-guide plate 31 can have a plurality of diffuser elements 37 disposed thereon. In this example, the diffuser elements 37 are a plurality of matrix dots that were formed by printing. Alternatively, the diffuser elements 37 may be formed by another method such as by injection molding, stamping, fly cut, V-cut, laser processing, or other known processing methods. Each of the matrix points shown in FIG. 6 has a similar area, but they are not evenly distributed on the second surface 312 of the light-guide plate 31. Embodiments of the light-guide plate, however, are not limited to diffuser elements 37 having an identical area—in some embodiments, some of the diffuser elements 37 may have different areas.

A close-up light-path diagram is shown in the partial view of FIG. 6. As can be seen in this diagram, the light emitted by light source 33 is reflected by the first groove 36. A large part of the light emitted to the first groove 36 by the light source 33 can be reflected by the first groove 36. But some light can still be emitted to the outside of the backlight module from the first groove 36. Thus, because the first grooves 36 are disposed above the light sources 33, much of the light emitted by the light sources can be reflected by the first grooves to decrease lamp mura. In addition to reflection, light can be diffused in the light-guide plate 31 by the diffuser elements 37.

Figure 7:
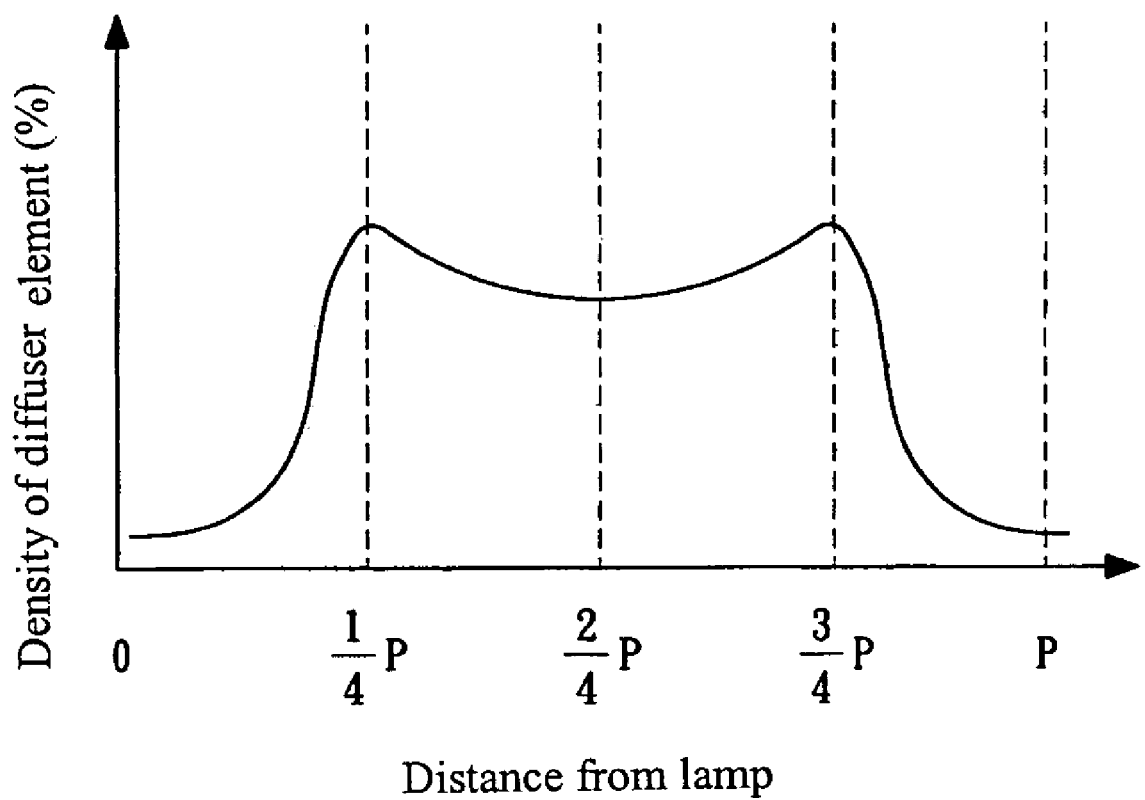
FIG. 7 is a graph showing the distribution curves of diffuser elements of the direct-type backlight module of FIG. 5 according to an embodiment.

The diffuser elements may be distributed between light sources. To achieve a better diffusion effect, the diffuser elements might be distributed such that the density (e.g., number of elements per unit area) of the diffuser elements is greatest at a distance from the light source of one-eighth ($\frac{1}{8}$) to three-eighths ($\frac{3}{8}$) the space of the light source's pitch (p), as depicted in FIGS. 3-6, and preferably the density of elements is highest at one-fourth ($\frac{1}{4}$)p. For example, if the matrix dots shown in FIG. 6 each have an identical area, there should be a greater number of dots disposed on the second surface of the light-guide plate at a distance of $\frac{1}{8}$p to $\frac{3}{8}$p, and preferably $\frac{1}{4}$p. In other words, the density of the diffuser element(s) is highest at a distance of $\frac{1}{8}$p to $\frac{3}{8}$p (preferably $\frac{1}{4}$p). Thus, diffuser elements having the same area are not evenly distributed on the second surface of the light-guide plate. The distribution curve(s) of the diffuser elements 37 is show in FIG. 7 where the distance from the light source is shown on the x-axis and the density of the diffuser elements is shown on the y-axis. As is shown in FIG. 7, the density of the diffuser elements is greatest at $\frac{1}{4}$p.

Alternatively, if the numbers (or density) of the diffuser elements are identical in each unit area on the second surface 312 of the light-guide plate 31, the diffuser elements 37 having the largest area are disposed on the second surface of the light-guide plate at a distance from a light source 33 corresponding to $\frac{1}{8}$p to $\frac{3}{8}$p (preferably $\frac{1}{4}$p).

Referring back to FIGS. 5 and 6, a light-mixing area between the upper surface of the reflector 32 and the lower surface of the optical film 35 is similar to the light-mixing area in FIGS. 3 and 4. For example, the height of this light-mixing area (between reflector 32 and film 35) can be effectively lowered to less than 20 mm and still avoid the lamp mura caused by the light sources 33.

Figure 8A:
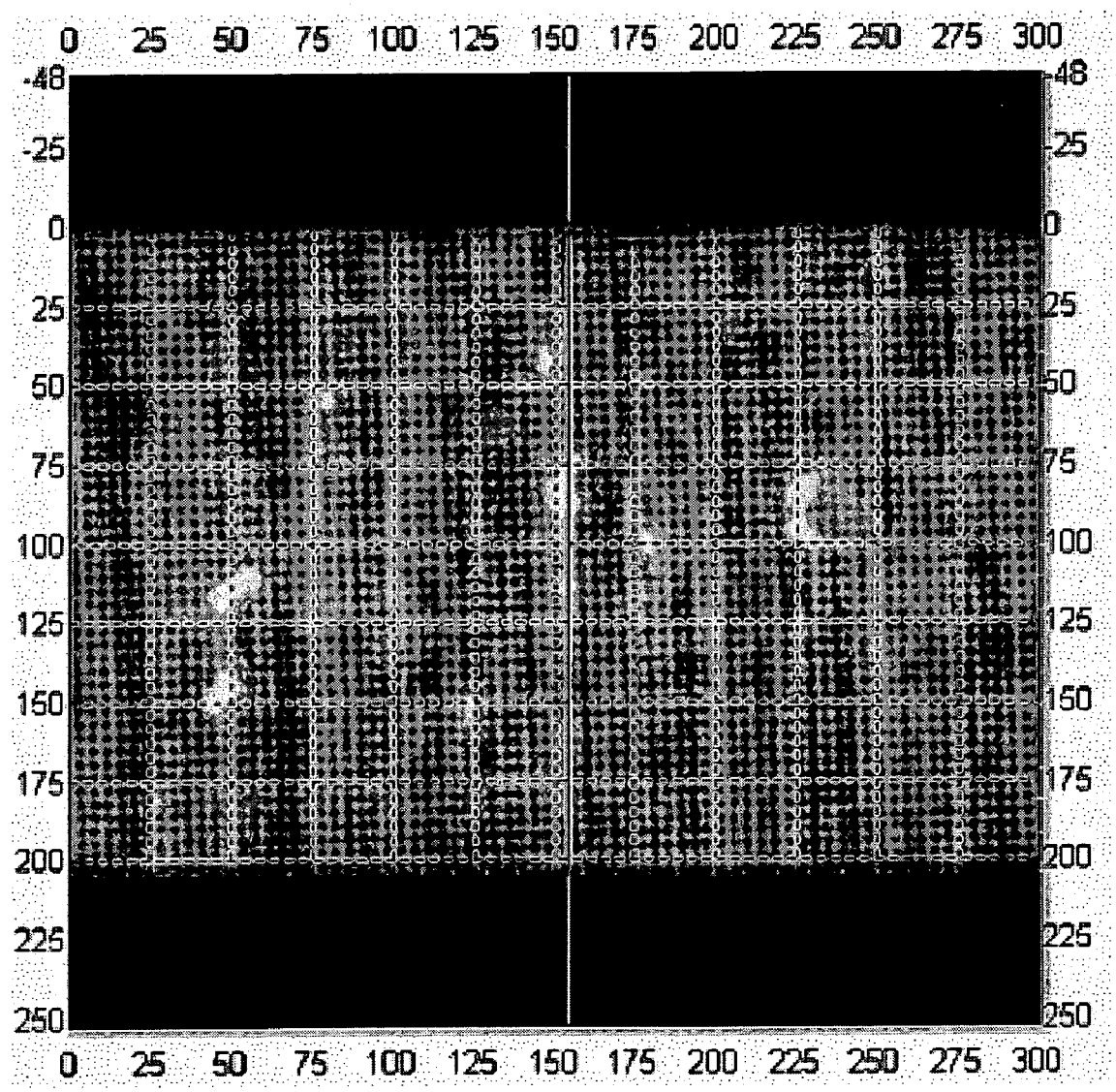
FIG. 8a is a top view of an optical simulation according to a first simulating device.

For example, referring to FIG. 8a, a top view of an optical simulation device is shown where the lamp mura caused by the light sources 33 is minimized if not almost nonexistent. The simulation device of FIG. 8a is similar to the direct-type backlight module 3 in that it includes the light-guide plate 31, the reflector 32, the light sources 33, and the housing 34. The simulation device of FIG. 8a, however, has one, as opposed to two, diffusing films. As is shown in FIG. 8a, with a light-guide plate (according to an embodiment of the present invention) installed, the light-mixing space may be reduced, the height of the light-mixing area may be lowered, and the thickness of the backlight module may also be reduced, all without the light sources causing lamp mura. Moreover, with a reduced thickness, the brightness of the backlight module is also enhanced.

Figure 8B:
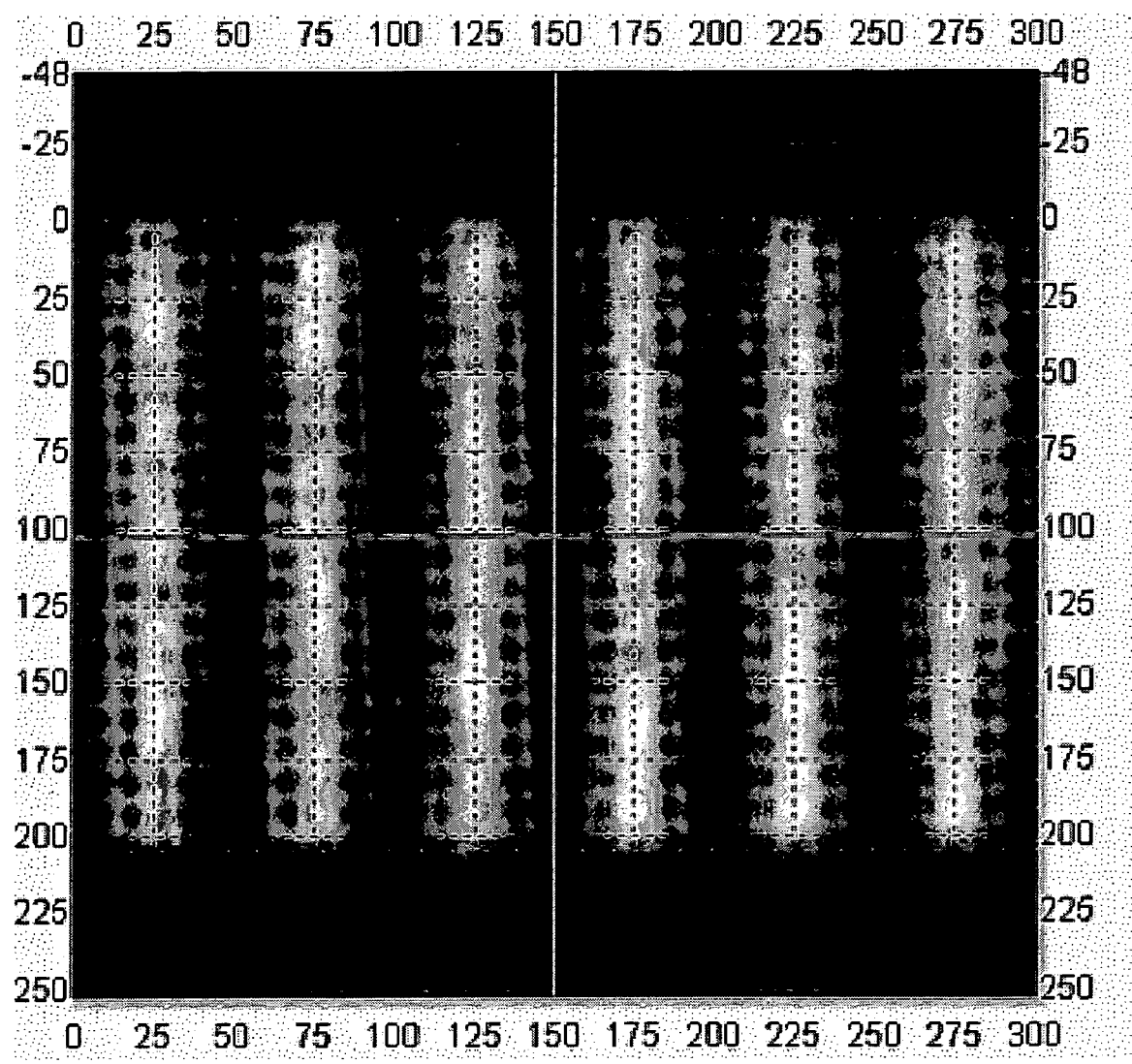
FIG. 8b is a top view of an optical simulation according to a second simulating device.

In contrast, another optical simulation device is shown in FIG. 8b. The device shown in FIG. 8b differs from that shown in 8a in that it does not include the light-guide plate 31. Without the light-guide plate 31, the brightness of the light sources 33 is unevenly distributed, and the lamp mura is very obvious.

Figure 9:
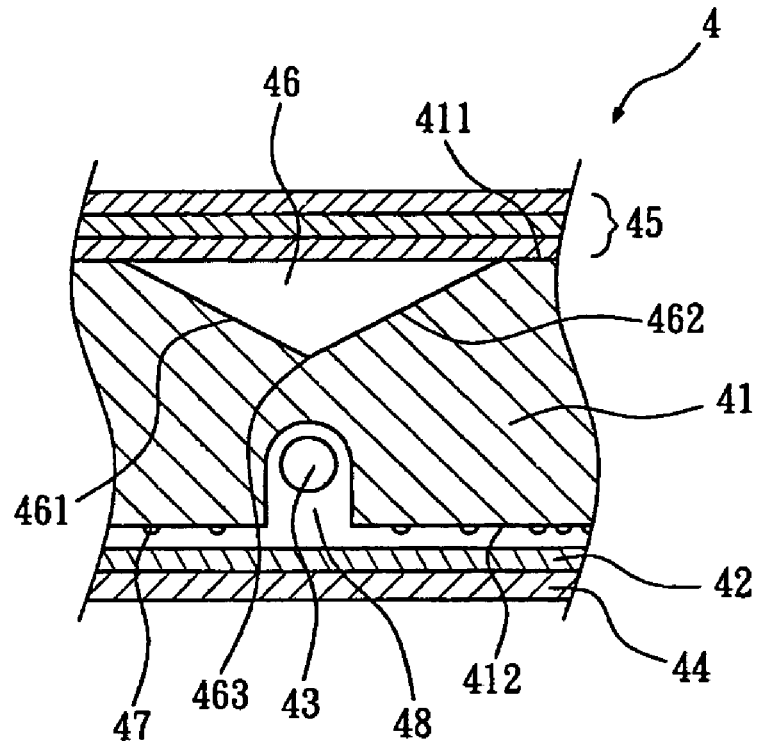
FIG. 9 is a close-up of a partial cross-sectional view of a direct-type backlight module according to another embodiment.
Figure 10:
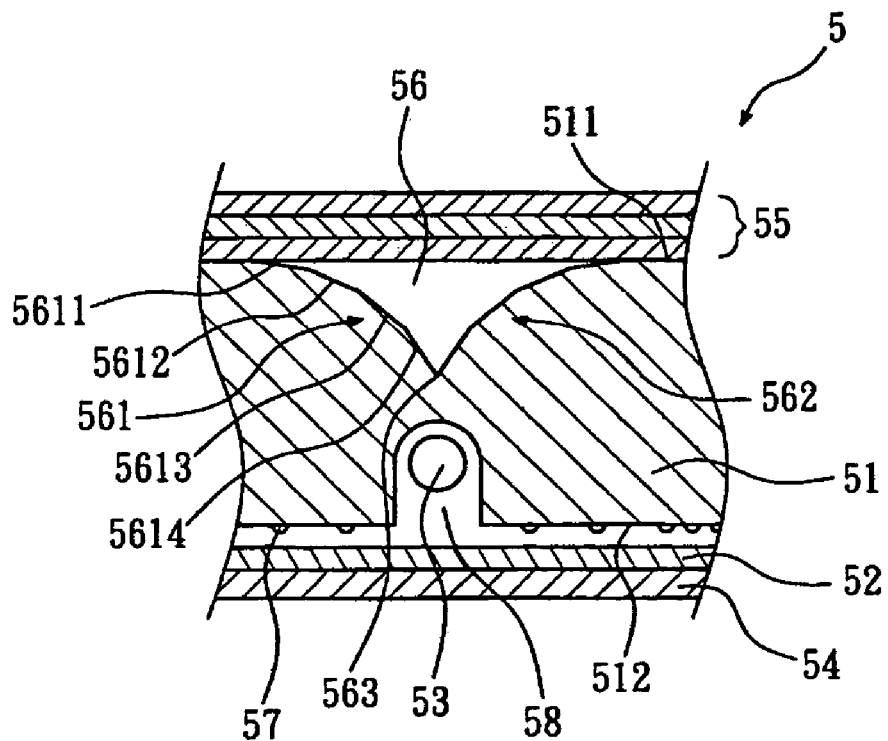
FIG. 10 is a close-up of a partial cross-sectional view of a direct-type backlight module according to yet another embodiment.

In some embodiments of the present invention, the first groove of the first surface of the light-guide plate may have two sides that are planes, as is shown in FIG. 9. Aside from this difference, the backlight module incorporating the light-guide plate is similar to the other embodiments of the backlight module. For example, the direct-type backlight module 4 may include a light-guide plate 41, a reflector 42, a plurality of light sources 43, a housing 44, and one or more optical films 45. Furthermore, the light-guide plate 41 may have a first surface 411 (an upper surface) and a second surface 412 (a lower surface) opposite the first surface 411. In some embodiments, the first surface 411 has a plurality of first grooves 46, and the second surface 412 has a plurality of diffuser elements 47 disposed thereon. The second surface can also have a plurality of second grooves 48. Each second groove 48 can oppose a first groove 46 and it may accommodate a light source 43. The first grooves 46 may be parallel to each other. Each first groove 46 may be formed by two sides, side 461 and side 462. As is shown in FIG. 9, the sides 461 and 462 are planes that converge at line 463. Each converging line 463 corresponds to and is situated above a second groove 48. The reflector 42 may be disposed under the second surface 412 of the light-guide plate 41 whereas the optical films 45 may be disposed above the first surface 411 of the light-guide plate 41.

In another embodiment of a direct-type backlight module, the shape of the groove in the first surface of the light-guide plate may have yet another profile. Otherwise, the backlight module may be similar to other embodiments of the backlight module. For example, referring to FIG. 10, the direct-type backlight module 5 includes a light-guide plate 51, a reflector 52, a plurality of light sources 53, a housing 54, and one or more optical films 55. The light-guide plate 51 has a first surface 511 (an upper surface) and a second surface 512 (a lower surface) opposite the first surface. The first surface 511 has a first groove 56, while the second surface 512 has a plurality of diffuser elements 57 and a second groove 58 opposing the first groove 56. If there is a plurality of first 56 and second 58 grooves, each second groove 58 accommodates a light source 53 and each second groove 58 corresponds to a first groove 56. The reflector 52 is disposed under the second surface 512 of the light-guide plate 51 and the optical films 55 are disposed above the first surface 511 of the light-guide plate 51. Although the first grooves 56 may have a different shape as compared to groove 36, the grooves 56 may still be parallel to each other. Furthermore, the first grooves 56 are formed by two sides, side 561 and side 562. The side 561 may have four sections: 5611, 5612, 5613, and 5614, and the profiles of the sections 5611, 5612, 5613, and 5614 may have different slopes. Similar sections may be found on side 562. The sides 561 and 562 converge at line 563. Line 563 corresponds to a second groove 58 such that each converging line 563 is situated above a second groove 58.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A direct-type backlight module, comprising:
    a housing;
    a light-guide plate disposed in said housing, said light-guide plate having a first surface and a second surface opposite the first surface, said first surface having a first groove;
    a light source situated in said housing below the first groove of the first surface of said light-guide plate and arranged such that light emitted by the light source is reflected by said first groove,
    a plurality of diffuser elements disposed on said second surface of said light-guide plate, said diffuser elements to diffuse light in said light-guide plate; and
    wherein regions covered by said diffuser elements are unevenly distributed on said second surface such that concentrated regions of said diffuser elements are formed at distances away from said light source of between one-eighth to three-eighths of a pitch of the light source.

2. The direct-type backlight module of claim 1, wherein said first groove is formed from two sides that converge at one line, said light source disposed substantially directly under said one line.

3. The direct-type backlight module of claim 2, including a plurality of said first grooves and a light source corresponding to each first groove in said plurality, wherein each groove in said plurality extends in one direction across said light-guide plate parallel to the other grooves in said plurality of first grooves.

4. The direct-type backlight module of claim 2, wherein said two sides are cambered.

5. The direct-type backlight module of claim 4, wherein the profile of said two sides is quadric.

6. The direct-type backlight module of claim 2, wherein said two sides are planar.

7. The direct-type backlight module of claim 2, wherein each side is formed by a plurality of sections, the profile of each section of a particular side having a different slope.

8. The direct-type backlight module of claim 1, wherein each diffuser element has the same area, and wherein said diffuser elements are unevenly distributed on the second surface of said light-guide plate such that the density of said diffuser elements is greatest at a distance from the light source of one-eighth to three-eighths the pitch of said light source.

9. The direct-type backlight module of claim 1, wherein at least some of the diffuser elements have areas that differ from another diffuser element, and wherein said diffuser elements are evenly distributed on the second surface of said light-guide plate per unit area such that the diffuser elements having the greatest areas are arranged at a distance from the light source of one-eighth to three-eighths the pitch of said light source.

10. The direct-type backlight module of claim 1, including a reflector, at least one optical film, and a light mixing area, said reflector situated in said housing, below the second surface of said light-guide plate, said at least one optical film disposed above said first surface of said light-guide plate, and said light-mixing area between said reflector and said at least one optical film, the height of said light-mixing area less than 20 mm.

11. The direct-type backlight module of claim 10, including a second groove in said second surface of said light-guide plate, said second groove opposing said first groove, said light source arranged in said second groove.

12. A liquid crystal display, comprising:
    a color filter substrate;
    a thin film transistor substrate arranged on one side of the color filter substrate;
    a liquid crystal layer disposed between said color filter substrate and said thin film transistor substrate;
    a backlight module disposed adjacent said thin film transistor substrate, said backlight module comprising:
        a light-guide plate having a first surface and a second surface opposite said first surface, said first surface having a plurality of parallel first grooves; and
        a plurality of light sources, each light source arranged to correspond to a particular groove in said first surface such that light emitted by the light source is reflected by said corresponding groove,
        a plurality of diffuser elements disposed on said second surface of said light-guide plate, said diffuser elements to diffuse light in said light-guide plate; and
        wherein regions covered by said diffuser elements arc unevenly distributed on said second surface such that concentrated regions of said diffuser elements are formed at distances away from said light source of between one-eighth to three-eighths of a pitch of the light source.

13. The liquid crystal display of claim 12, wherein each first groove is formed from two sides that converge at one line, said one line arranged over the corresponding light source.

14. The liquid crystal display of claim 13, wherein said two sides are cambered.

15. The liquid crystal display of claim 14, wherein the profile of said two sides is quadric.

16. The liquid crystal display of claim 13, wherein said two sides are planar.

17. The liquid crystal display of claim 13, wherein each of the two sides is formed by a plurality of sections, the profile of each section of a particular side having a different slope.

18. The liquid crystal display of claim 12, wherein said second surface of said light-guide plate has a plurality of second grooves, each second groove opposite a corresponding first groove, said second groove to accommodate the corresponding light source arranged under the first groove.

19. The liquid crystal display of claim 12, wherein each diffuser element has the same area, and wherein said diffuser elements are unevenly distributed on second surface of said light-guide plate such that the density of said diffuser elements is greatest at distances from the light sources of one-eighth to three-eighths the pitch of said light sources.

20. The liquid crystal display of claim 12, including a reflector, an optical film, and a light-mixing area, said reflector disposed adjacent said second surface of said light-guide plate, said optical film disposed adjacent said first surface of said light-guide plate, and said light-mixing area between said reflector and said optical film, the height of said light-mixing area less than 20 mm.

21. The liquid crystal display of claim 12, wherein at least some of the diffuser elements have areas that differ from another diffuser element, and wherein said diffuser elements are evenly distributed on the second surface of said light-guide plate per unit area such that the diffuser elements having the greatest areas are arranged at distances from the light sources of one-eighth to three-eighths the pitch of said light sources.

22. A light-guide plate, comprising:
 a first surface and a second surface opposite said first surface;
 a plurality of parallel first grooves disposed on said first surface of the light-guide plate to reflect light;
 a plurality of second grooves disposed on the second surface, each second groove opposite a corresponding first groove; and
 a plurality of diffuser elements disposed on said second surface to diffuse light in said light-guide plate,
 wherein regions covered by said diffuser elements are unevenly distributed on said second surface such that concentrated regions of said diffuser elements are formed at distances from said second groove of one-eighth to three-eighths a pitch of the second groove.

23. The light-guide plate of claim 22, wherein each diffuser element has the same area, and wherein said diffuser elements are unevenly distributed on said second surface of said light-guide plate such that the density of said diffuser elements is greatest at a distance from said second groove of one-eighth to three-eighths the pitch of the second groove.

24. The light guide plate of claim 22, wherein at least some of the diffuser elements have areas that differ from another diffuser element, and wherein said diffuser elements are evenly distributed on the second surface of said light-guide plate per unit area such that the diffuser elements having the greatest areas are arranged at a distance from the second groove of one-eighth to three-eighths the pitch of said second groove.

* * * * *

UNITED STATES PATENT AND TRADEMARK OFFICE
CERTIFICATE OF CORRECTION

| | |
|---|---|
| PATENT NO. | : 7,527,414 B2 |
| APPLICATION NO. | : 11/636855 |
| DATED | : May 5, 2009 |
| INVENTOR(S) | : Chen-Pin Hung et al. |

It is certified that error appears in the above-identified patent and that said Letters Patent is hereby corrected as shown below:

Column 8:
Line 4, "arc" should be --are--.

Signed and Sealed this

Fourteenth Day of July, 2009

JOHN DOLL
*Acting Director of the United States Patent and Trademark Office*